Feb. 2, 1954

H. W. B. SKINNER
BEAM FOCUSING LENS 2,668,241

Filed Nov. 25, 1947

INVENTOR.
H. W. B. SKINNER
BY
ATTORNEY

Feb. 2, 1954  H. W. B. SKINNER  2,668,241
BEAM FOCUSING LENS
Filed Nov. 25, 1947  3 Sheets-Sheet 3

INVENTOR.
H. W. B. SKINNER
BY
Robert A. Lavender
ATTORNEY

Patented Feb. 2, 1954

2,668,241

UNITED STATES PATENT OFFICE 2,668,241

BEAM FOCUSING LENS

Herbert W. B. Skinner, Harwell, England

Application November 25, 1947, Serial No. 787,877

4 Claims. (Cl. 250—41.9)

This invention relates to the focusing of divergent ion beams and more particularly relates to improved electrostatic focusing means for increasing the sharpness of the foci of divergent arcuate ion beams in the electromagnetic separation of isotopes.

In the operation of devices which employ electromagnetic means for separating isotopes the high current ion beams generally employed are ion beams which have a virtual line source parallel to the magnetic field, and in addition have considerable divergences in a plane transverse to said magnetic field. Furthermore, whereas certain ions, such as for example $U^{235}$ and $U^{238}$, have a theoretical foci separation at the 180° position of over two inches for ion beam radii of about 50 inches, it has been found that when employing no other focusing means than that of the uniform magnetic field, the beams will have an actual separation of less than an inch and with the degree of sharpness of focus thereby obtainable will therefore overlap in the region of their maximum separation. Thus in order to obtain a separation of the ion beams which will approach the theoretical foci separation of about two inches, it is necessary to provide an arrangement which will divert them from their normal arcuate paths and into sharp foci in the region of their maximum separation.

In the copending application, Serial Number 63,274, filed December 3, 1948, now Patent No. 2,658,150, issued November 3, 1953, by Bernard Peters and John G. Backus there is described an electrostatic focusing arrangement comprising a plurality of parallel spaced shield-shaped electrodes disposed in the ion beam plasma with planar surfaces lying transverse to the magnetic field. Moreover, the arcuate edges of said electrodes lie in a common magnetic projection; the surface generated by said projection being curved in the manner of a refracting lens. Further, the electrodes are charged relative to the tank at a potential of value and sign predetermined by design considerations. A characteristic of such an electrostatic lens arrangement is that considerable ion absorption results from the relatively strong electric field necessary to effect sufficient angular deflection of the ions in directing them to a common initial focus.

The present invention is an improved electrostatic lens designed to subject the ions to a series of relatively small angular deflections as opposed to relatively large angular deflections as in the case of earlier lenses. Inasmuch as the smaller angular deflections do not require such strong electric fields, there will be less ion absorption on the electrodes defining the lens.

It is therefore an object of this invention to improve the electromagnetic separation of isotopes by increasing the sharpness of foci of divergent arcuate ion beams.

It is a further object of this invention to improve the sharpness of foci of divergent arcuate ion beams in the electromagnetic separation of isotopes, beyond the sharpness which can be obtained through the effect of the uniform magnetic field alone.

It is a further object of this invention to increase the sharpness of foci of divergent arcuate ion beams by improved electrostatic focusing means.

It is a further object of this invention to increase the sharpness of foci of divergent arcuate ion beams by employing electrostatic fields passing transversely through the plane of the divergent arcuate ion beams.

A further object of this invention is to minimize the ion absorption of the electrostatic lens system by using reduced electric field potentials thereby to subject the ions to a series of relatively small angular deflections to effect sufficient angular deflection of the ions in directing them to a common initial focus.

Other objects and advantages of the invention will be apparent in the following description and claims considered together with the accompanying drawings in which:

Figure 1:
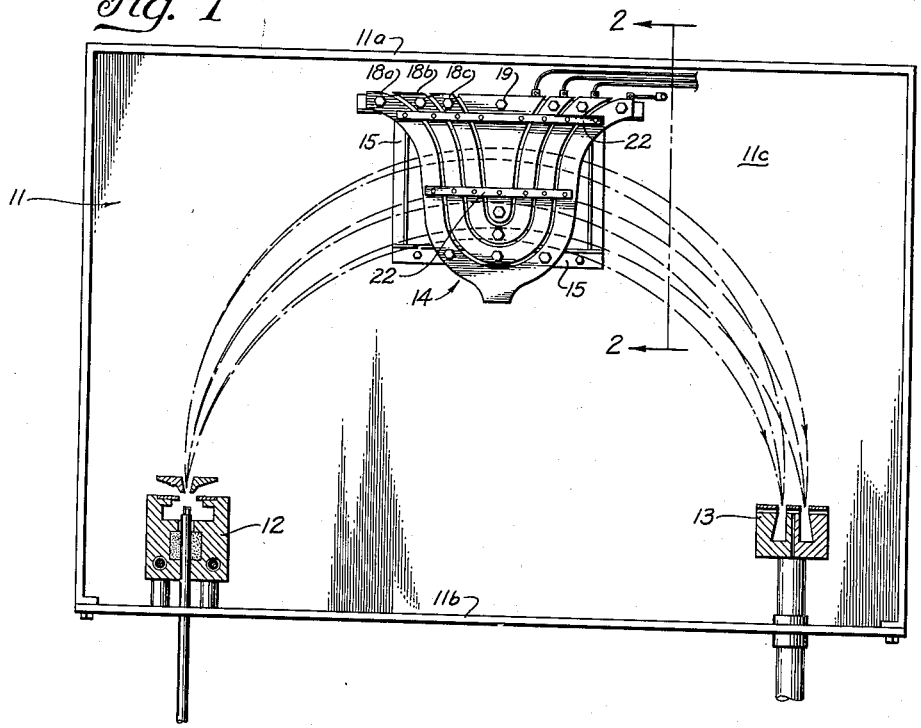
Figure 1 is a plan view of the calutron tank with the top plate removed showing the electrostatic lens positioned therein with relation to the ion transmitter, the divergent arcuate ion beam, and the ion receiver.
Figure 2:
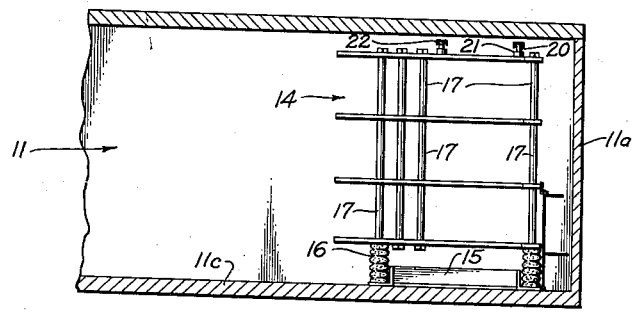
Fig. 2 is a partial horizontal section of the calutron tank with the top plate in place showing the electrostatic lens assembly mounted on the bottom plate of the calutron tank by means of insulators, as indicated by section line 2—2 in Fig. 1.
Figure 3:
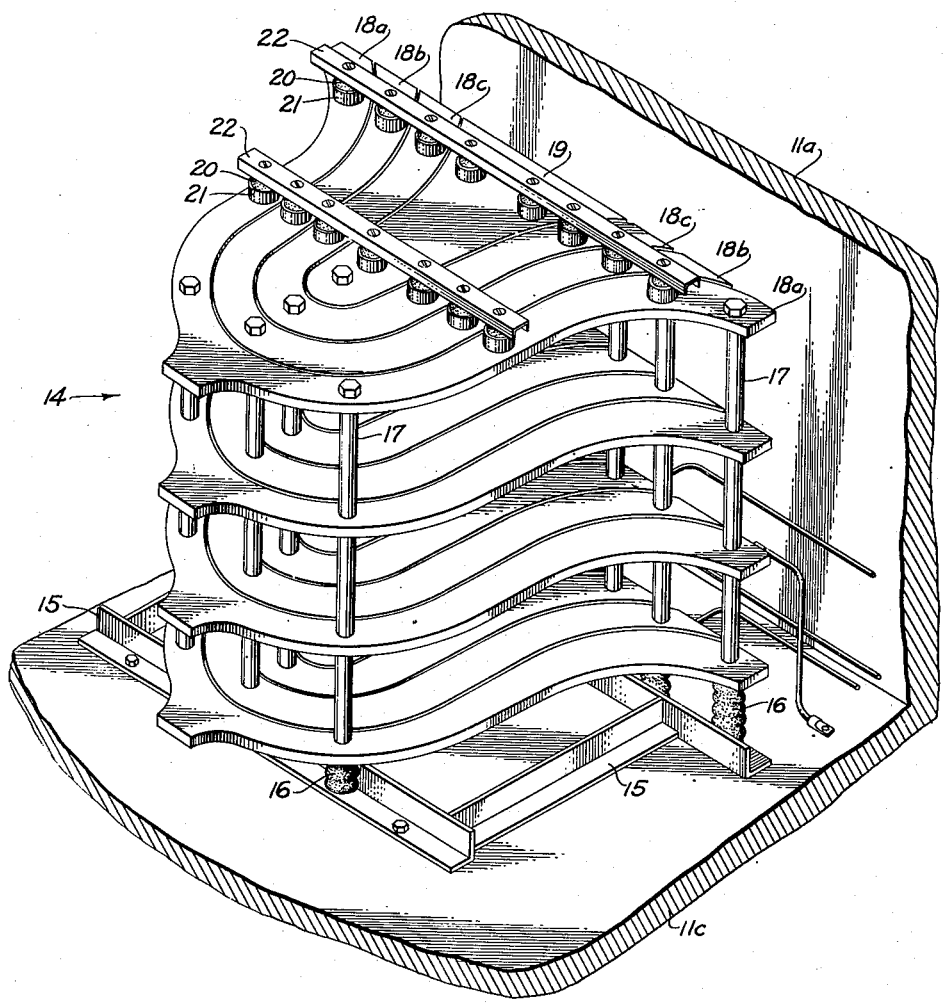
Fig. 3 is a perspective view of the electrostatic lens system mounted on the bottom wall of the calutron tank showing four identical decks of flat electrodes, each deck being an assembly of flat substantially V-shaped electrode strips arranged around a shield-shaped central plate.
Figure 4:
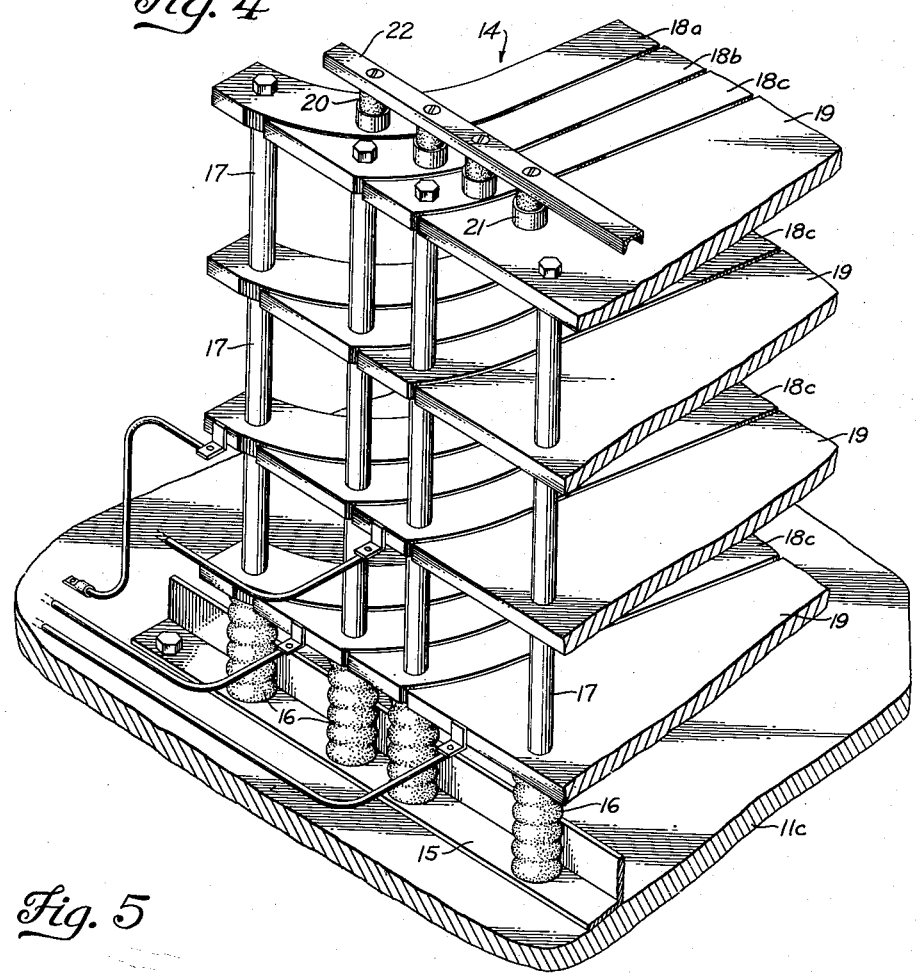
Fig. 4 is a partial perspective view from the rear of the electrostatic lens system showing portions in broken section and indicating details pertaining to mounting, assembly, and electrical connections.
Figure 5:
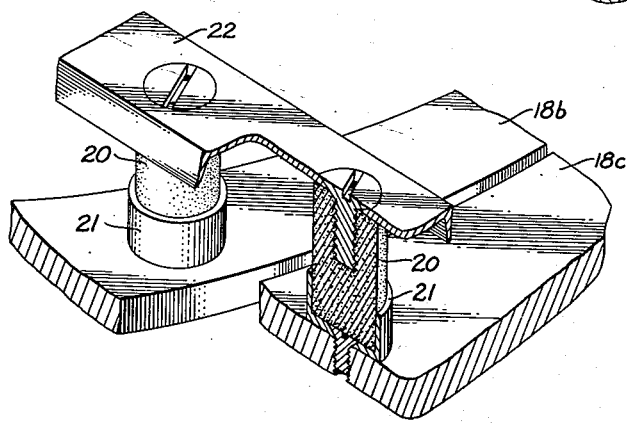
Fig. 5 is a partial perspective view showing a broken portion of the electrostatic lens system illustrating the manner of insulating the electrode-spacer member with regard to coplanar electrodes.

Referring now to Figs. 1 and 2, there is illustrated the present type of electric lens as disposed in a calutron. The lens 14 is positioned near the rear wall 11a of the calutron tank 11 midway between the ion transmitter 12 and the ion receiver 13, the ion transmitter 12 and the ion receiver 13 being mounted on the front wall 11b of tank 11. The electric lens assembly 14 (see Fig. 4) is mounted on structural steel angle frame 15 upon the bottom wall 11c of the calutron tank 11 and by means of electrical insulators 16 which in turn attach to conducting and supporting uprights 17. The lens is formed by four substantially identical decks of flat electrodes, each deck being an assembly of three substantially V-shaped nested electrode strips 18a, 18b and 18c arranged around a shield shaped central plate electrode 19. The four decks are supported in vertically spaced relationship so as to overlie one another. Although the strip electrodes and central plate electrode in each deck are electrically insulated from one another, the strips and central plates in each vertical row are electrically connected to one another by the conducting uprights 17. More particularly, the outermost strip 18a in each deck is grounded to the calutron tank 11 and, working inwardly, the next strips 18b are electrically connected to one another and to a source of potential, and similarly the next strips 18c are connected to one another and to a different potential; the central plates being connected to one another and to still a different potential. The values of the potentials may increase or decrease working inwardly, in accordance with the type of lens desired. The spacing between adjacent nested elements is further maintained by means of insulators 20 attached to structural steel channel members 22 which are insulated from and lie across the top deck of the lens assembly 14 normal to the axis bisecting the deck. The insulators 20 are in turn fastened to the electrodes at suitable points of support as indicated in Figs. 1, 3, 4 and 5. Insulators 20 are each partially housed by cup-like electrostatic shields 21 as illustrated in Fig. 5.

In the operation of the calutron employing the present invention as a focusing means, in addition to the magnetic field, the divergent ion beam in its arcuate traverse from the ion transmitter to the ion receiver passes through the electrostatic lens; the beam focus in the region of the ion receiver being sharpened thereby. The lens arrangement comprises four parallel spaced planar decks, each deck consisting of three nested substantially V-shaped electrodes disposed around a shield-shaped central plate electrode. The electrodes in the upper deck are substantially identical to and overlie their respective counterparts in the decks beneath. Each set of such counterpart electrodes are electrically connected, adjacent sets being connected to differing sources of electrical potential whereby electrostatic fields are set up, the equipotential surfaces of which lie in the magnetic projections of the electrodes' edges. By appropriate design embodiments of the present invention, the configurations of the multiple equipotential surfaces so generated with respect to the passage of the ions therethrough, serves to divert these ions from their normal trajectories in a series of small angular deflections thereby directing ions having equal mass to charge ratios to a common focus. Since the electrostatic lens design comprising the present invention permits the use of reduced electrical potentials to accomplish the total angular deflection necessary to bring ions to a focus by imparting to these ions a series of small angular deflections, reduced ion absorption by the lens will result as compared to earlier types of electrostatic lenses which require higher electrical potentials and impart only two angular deflections to the ions to accomplish the total angular deflection necessary to obtain the desired focusing effect.

While I have described the salient features of this invention in detail with respect to one embodiment it will, of course, be apparent that numerous modifications may be made within the spirit and scope of this invention and I do not therefore desire to limit the invention to the exact details shown except insofar as they may be defined in the following claims.

What is claimed is:

1. In an apparatus for the electromagnetic separation of ions or isotopes including a tank, means for establishing a magnetic field through said tank, an ion source, a divergent arcuate ion beam the arcuate plane of which lies transverse to said magnetic field, and an ion receiver; an arrangement of curved nested electrodes disposed in planar decks transverse to said magnetic field, potential supply means impressing a different potential upon each of the electrodes in a deck, and electrical interdeck connections joining like electrodes thereby defining an electrostatic lens imparting a series of angular deflections to said ions in their traverse through the medium of said lens whereby ions having equal mass to charge ratios are directed to an initial focus in the region of said receiver.

2. In an apparatus for the electromagnetic separation of ions or isotopes including a tank, means for establishing a magnetic field through said tank, an ion source, a divergent arcuate ion beam the arcuate plane of which lies transverse to said magnetic field, and an ion receiver; an arrangement of curved nested electrodes disposed in planar decks transverse to said magnetic field, interdeck connections electrically joining like electrodes, and means for charging the electrodes of a deck to potentials of different values thereby defining an electrostatic lens, said lens being disposed in the path of said ion beam midway of the ion beam arc whereby ions having equal mass to charge ratios are directed to an initial focus in the region of said receiver.

3. In an apparatus for the electromagnetic separation of ions or isotopes including a tank, means for establishing a magnetic field through said tank, an ion source, a divergent arcuate ion beam the arcuate plane of which lies transverse to said magnetic field, and an ion receiver; an arrangement of curved nested electrodes disposed in planar decks transverse to said magnetic field, potential supply means impressing a different potential upon each of the electrodes of a deck, and interdeck connections electrically joining like electrodes, thereby defining an electrostatic lens, said lens being disposed in the path of said ion beam and said electrodes defining said lens being symmetrically arranged with respect to the radial bisector of the ion beam arc whereby ions having equal mass to charge ratios are directed to an initial focus in the region of said receiver.

4. In an apparatus for the electromagnetic separation of ions or isotopes including a tank, means for establishing a magnetic field through said tank, an ion source, a divergent arcuate ion beam the arcuate plane of which lies transverse to said magnetic field, and an ion receiver; a planar arrangement of curved nested strip electrodes their peripheral edges being substantially shield-shaped and enclosing a shield-shaped central plate electrode, said arrangement of electrodes being duplicated in a plurality of parallel spaced decks, corresponding electrodes in each deck being electrically connected and their edges lying in a common magnetic projection, means for charging the electrodes of a deck to different potentials, thereby defining an elastrostatic lens adapted to impart a series of angular deflections to said ions in their traverse through the medium of said lens whereby ions having equal mass to charge ratios are directed to an initial focus in the region of said receiver.

HERBERT W. B. SKINNER.

No references cited.